(12) United States Patent
Haga et al.

(10) Patent No.: US 6,849,573 B2
(45) Date of Patent: Feb. 1, 2005

(54) METHANOL REFORMING CATALYST

(75) Inventors: Fumihiro Haga, Kanagawa-ken (JP);
Hiroaki Kaneko, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 80 days.

(21) Appl. No.: 09/734,891

(22) Filed: Dec. 13, 2000

(65) Prior Publication Data

US 2001/0016188 A1 Aug. 23, 2001

(30) Foreign Application Priority Data

Dec. 15, 1999 (JP) .......................................... P11-356674
Dec. 4, 2000 (JP) ...................................... P2000-368625

(51) Int. Cl.⁷ ................................................ B01J 23/60
(52) U.S. Cl. ...................... 502/329; 502/326; 502/331
(58) Field of Search ................................ 502/327, 329, 502/331, 332, 333, 334, 339, 342, 343, 346, 349, 355, 439, 527.12, 242, 245, 253, 262

(56) References Cited

U.S. PATENT DOCUMENTS

| | | | |
|---|---|---|---|
| 3,898,057 A | | 8/1975 | Moller et al. ............. 48/197 R |
| 3,970,739 A | * | 7/1976 | Shiraishi et al. .......... 423/23 S |
| 3,997,477 A | | 12/1976 | Takeuchi .................... 252/465 |
| 4,105,590 A | * | 8/1978 | Koberstein et al. ......... 252/464 |
| 4,237,032 A | * | 12/1980 | Evans et al. ................ 252/462 |
| 4,492,769 A | * | 1/1985 | Blanchard et al. .......... 502/262 |
| 4,581,343 A | * | 4/1986 | Blanchard et al. .......... 502/241 |
| 4,711,870 A | * | 12/1987 | Yamada et al. ............. 502/303 |
| 4,927,857 A | * | 5/1990 | McShea, III et al. ....... 518/703 |
| 4,939,292 A | * | 7/1990 | Elliott et al. ................ 560/239 |
| 4,950,385 A | * | 8/1990 | Sivasanker et al. .......... 208/64 |
| 4,963,521 A | * | 10/1990 | Engler et al. ................ 502/207 |
| 4,985,211 A | * | 1/1991 | Akiyama et al. ............ 422/171 |
| 5,039,647 A | * | 8/1991 | Ihara et al. .................. 502/251 |
| 5,212,142 A | * | 5/1993 | Dettling ...................... 502/304 |
| 5,266,730 A | * | 11/1993 | Abe et al. ................... 564/398 |
| 5,376,610 A | * | 12/1994 | Takahata et al. ............. 502/66 |
| 5,635,439 A | * | 6/1997 | Fukui et al. ................. 502/328 |
| 5,814,227 A | * | 9/1998 | Pavlis ......................... 210/696 |
| 5,849,254 A | * | 12/1998 | Suzuki et al. ............. 423/213.5 |
| 5,894,068 A | * | 4/1999 | Kharas et al. ............... 502/327 |
| 5,935,529 A | * | 8/1999 | Saito et al. .................. 422/177 |
| 5,945,369 A | * | 8/1999 | Kimura et al. .............. 502/304 |
| 6,087,295 A | * | 7/2000 | Kharas et al. ............... 502/300 |
| 6,123,913 A | * | 9/2000 | Clawson et al. ............. 423/652 |
| 6,217,831 B1 | * | 4/2001 | Suzuki et al. ............... 422/177 |
| 6,221,804 B1 | * | 4/2001 | Yamada et al. .............. 502/326 |
| 6,245,303 B1 | * | 6/2001 | Bentley et al. .............. 422/193 |

FOREIGN PATENT DOCUMENTS

| | | |
|---|---|---|
| DE | 3405217 A1 | 8/1984 |
| JP | 50-49204 | 5/1975 |
| JP | 51-68488 | 6/1976 |
| JP | 58-174237 | 10/1983 |
| JP | 58-177153 | 10/1983 |
| JP | 5-261288 | 10/1993 |
| JP | 2000-281303 | 10/2000 |

* cited by examiner

*Primary Examiner*—Stanley S. Silverman
*Assistant Examiner*—Edward M. Johnson
(74) *Attorney, Agent, or Firm*—Foley & Lardner LLP

(57) ABSTRACT

A methanol reforming catalyst that generates a reformed gas containing hydrogen by reforming methanol under the presence of oxygen and steam, comprises a catalytic component I containing Cu oxide and Zn oxide, and a catalytic component II containing metal oxide and one of Pt and Pd. Also, another methanol reforming catalyst comprises a catalytic component I containing Cu oxide and Zn oxide, a catalytic component IIA containing first metal oxide and a noble metal, and a catalytic component IIB containing second metal oxide and one of Pt and Pd. The second metal oxide forms an alloy more easily than the first metal oxide. The auto-thermal reforming process can be stably accelerated in the methanol reforming reaction using these catalysts. Also, there are provided a reformer, a reforming apparatus, and a fuel cell system employing these methanol catalysts. Since a heater or a reducing apparatus can be omitted in these apparatuses, etc., sizes of these apparatuses, etc. become small and thus these apparatuses, etc. are suitable for the installing into the mobile body.

10 Claims, 10 Drawing Sheets

FIG.7

Table.1

| Example | Composition of catalyst | | | Reaction time (min) | Co concentration (%) | Reformation rate (%) |
|---|---|---|---|---|---|---|
| | 1st catalyst layer | 2nd catalyst layer | 3rd catalyst layer | | | |
| example 1 | CuO-ZnO | Pd/ZnO | — | 0.5<br>1<br>5 | 1.1<br>0.9<br>0.9 | 98<br>100<br>100 |
| example 2 | CuO-ZnO | Pd-Zn-CeO2-ZrO2 | — | 0.5<br>1<br>5 | 1<br>0.9<br>0.9 | 98<br>100<br>100 |
| example 3 | CuO-ZnO | Pt/Al2O3 | Pd/ZnO | 0.5<br>1<br>5 | 1.5<br>1.5<br>1.5 | 100<br>100<br>100 |
| example 4 | CuO-ZnO | Pt/Al2O3 | Pd-Zn-CeO2-ZrO2 | 0.5<br>1<br>5 | 1.5<br>1.5<br>1.5 | 100<br>100<br>100 |
| example 5 | CuO-ZnO | CuO-ZnO | Pd/ZnO | 0.5<br>1<br>5 | 1.3<br>1.3<br>1.3 | 100<br>100<br>100 |
| example 6 | Pt/Al2O3 | CuO-ZnO | Pd-Zn-CeO2-ZrO2 | 0.5<br>1<br>5 | 1.3<br>1.3<br>1.3 | 100<br>100<br>100 |
| example 7 | Pt-Al2O3+CuO-ZnO<br>※1) | | | 0.5<br>1<br>5 | 1.2<br>1.4<br>1.4 | 90<br>95<br>99 |
| comparative example 1 | 1st catalyst: Pt/Al2O3 ※2) | 2nd catalyst: CuO-ZnO ※3) | | 0.5<br>1<br>5 | 5.1<br>6.2<br>6.5 | 99<br>100<br>100 |

※1) These components of catalyst are mixed in a single layer.
※2) This component is arranged in the upper stream.
※3) This component is arranged in the lower steam.

FIG.8

Table.2

| Example | Composition of catalyst | | After 50hr-reaction | |
|---|---|---|---|---|
| | 1st catalyst layer | 2nd catalyst layer | Co concentration (%) | Reformation rate (%) |
| example 1 | CuO-ZnO | Pd/ZnO | 1.2 | 98.5 |
| example 2 | CuO-ZnO | Pd-Zn-CeO2-ZrO2 | 1.1 | 99.5 |
| comparative example 2 | CuO-ZnO | — | 0.9 | 83.3 |

METHANOL REFORMING CATALYST

BACKGROUND OF THE INVENTION

1. Field of the Invention

The present invention relates to a catalyst used in a reaction for manufacturing a hydrogen gas by reforming a hydrogen-containing gas such as methanol, etc. More particularly, a catalyst for a methanol gas reforming reaction for generating the hydrogen-containing gas that is suitable for a fuel gas supplied to a fuel cell used in a power source of a mobile body, etc.

2. Description of the Related Art

The fuel cell is a device that directly converts a chemical energy of a fuel into an electrical energy and can achieve high energy conversion efficiency. The major fuel employed in the fuel cell is hydrogen, but a fuel gas (reformed gas) containing hydrogen and carbon dioxide except the hydrogen can be employed in the fuel cell such as a polymer electrolyte fuel cell, a phosphoric acid fuel cell, a molten carbonate fuel cell, etc. For this reason, in the fuel cell system having these fuel cells, a reforming apparatus that reforms the fuel (hydrogen-containing fuel) to generate a reformed gas containing the hydrogen is provided.

In the reforming apparatus in the prior art, a reforming reaction for reforming a methanol gas by using a Steam to generate the hydrogen, i.e., a steam reforming reaction expressed by following Eq. (f1), is carried out $$CH_3OH+H_2O \rightarrow CO_2+3H_2 \tag{f1}$$

Since the steam reforming reaction (f1) is the endothermic reaction, heating is applied by providing a burner, a heater, or the like to the reforming apparatus and thus a heat quantity necessary for start and maintenance of the reforming reaction is supplied.

Also, as a reforming catalyst for promoting the above reforming reaction, the copper-zinc (Cu—Zn) based catalyst disclosed in Laid-Open Patent Publication Hei 5-261288 published in 1993 is used. This Cu—Zn based catalyst has high reaction selectivity in the steam reforming reaction, but a copper component serving as the reaction active species is copper oxide in its initial state, and therefore the reducing process must be performed at 250 to 300° C. prior to use. This reducing process may be conducted in the reforming apparatus, otherwise the reducing apparatus for performing the reducing process using the hydrogen may be attached separately.

SUMMARY OF THE INVENTION

A fuel cell system loaded in a car is required to satisfy compactness and good starting performance. In recent years, the methanol reforming employing the auto-thermal reforming process based on two reactions expressed by following Eqs. (f1)(f2) has been expected to satisfying the requirement.

$$CH_3OH+H_2O \rightarrow CO_2+3H_2 \tag{f1}$$

$$CH_3OH+\tfrac{1}{2}O_2 \rightarrow CO_2+2H_2 \tag{f2}$$

In this auto-thermal reforming process, the partial oxidation reaction (f2) as the exothermic reaction occurs simultaneously with or prior to the steam reforming reaction (f1) as the endothermic reaction. Thus, heat generated by the partial oxidation reaction (f2) is used as the heat required to start and maintain the steam reforming reaction (f1). As a result, there is no need to provide the heater or the burner to the reforming apparatus, and thus the reduction in size of the apparatus can be achieved.

In this auto-thermal reforming process, the reforming reaction is executed by supplying the air or the oxygen to the fuel and the water. Therefore, the used catalyst needs the resistance against the oxidizing atmosphere. The Cu—Zn based catalyst used in the prior art exhibits the high selectivity in the steam reforming reaction, nevertheless such Cu—Zn based catalyst is not suitable for the auto-thermal reforming process in the oxygen atmosphere because of catalytic activity degradation due to the oxidation and thermal degradation due to the exothermic reaction generated locally.

Meanwhile, the noble metal catalyst using platinum or palladium, that is disclosed in Laid-Open Patent Publications Sho 58-174237 and Sho 58-177153 published in 1983, and the base metal catalyst using nickel Or cobalt, that is disclosed in Laid-Open Patent Publications Sho 50-49204 published in 1975 and Sho 51-68488 published in 1976 have the oxidation resistance. However, these catalysts promote mainly the methanol decomposition reaction expressed by following Eq. (f3) and thus generate a large quantity of carbon monoxide (CO), that is harmful for the operation of the fuel cell, together with the hydrogen.

$$CH_3OH \rightarrow CO+2H_2 \tag{f3}$$

Accordingly, it is not preferable to employ the above noble metal catalyst and the base metal catalyst in the fuel reforming reaction for the polymer electrolyte fuel cell, in which the CO concentration must be suppressed lower than several tens ppm, and the phosphoric acid fuel cell, in which the CO concentration must be suppressed lower than 1%.

As described above, according to the steam reforming reaction using the Cu—Zn based catalyst, the heat quantity needed to proceed the reforming reaction must be supplied from the outside of the reactor and thus the reduction in size is difficult. Also, since the Cu—Zn based catalyst needs the reducing process by the hydrogen prior to use, it has the problem in respects of productivity, safety, and compactness.

Meanwhile, the auto-thermal reforming process using the steam reforming reaction (f1) and the partial oxidation reaction (f2) of the methanol together is promising, but the Cu—Zn based catalyst degrades. On the contrary, if the noble metal based catalyst having the durability is used, there is caused the problem that a carbon monoxide (CO) concentration is increased.

The present invention has been made to overcome these subjects, and it is an object of the present invention to provide a compact methanol reforming catalyst that has excellent durability and generates a small amount of CO in an auto-thermal reforming process and has a high catalytic performance.

It is another object of the present invention to provide a methanol reforming method, a reformer, a reforming apparatus, and a fuel cell system using this methanol reforming catalyst.

In order to achieve the above objects, a first aspect of the methanol reforming catalyst of the present invention is to comprise a catalytic component I containing Cu oxide and Zn oxide, and a catalytic component II containing metal oxide and any one of platinum (Pt) and palladium (Pd).

According to the first aspect of the methanol reforming catalyst of the present invention, respective features of the catalytic component I as the Cu—Zn based catalyst and the catalytic component II as the noble metal catalyst can be supplemented each other during the progress of the autothermal reforming process using a mixed gas of methanol, oxygen, and steam. That is, first the partial oxidation reaction with heat generation by the catalytic component II occurs to generate the reducing gas containing carbon monoxide. Since this reducing gas reduces the catalytic component I to not only induce the catalytic function but also maintain the reduced condition, it can prevent the degradation in the catalytic activity of the catalytic component I due to the oxidation. Also, since the heat generated by the partial oxidation reaction activates the catalytic component I and then the activated catalytic component I accelerates the reaction for shifting the carbon monoxide to the carbon dioxide, a carbon monoxide concentration can be reduced, in addition, the catalytic component I and the catalytic component II after activation can accelerate the partial oxidation reaction and the steam reforming reaction.

Accordingly, if the methanol reforming catalyst of the present invention is employed, it is possible to omit the heating apparatus for the steam reaction and the reducing apparatus for using Cu—Zn based catalyst. Also, a CO concentration in the reformed gas can be decreased and also the auto-thermal reforming process can be accelerated stably for a long time.

A second aspect of the methanol reforming catalyst of the present invention comprises a catalytic component I containing Cu oxide and Zn oxide, a catalytic component IIA containing a first metal oxide and a noble metal, and a catalytic component JIB containing a second metal oxide and any one of Pt and Pd, wherein the second metal oxide produces an alloy more easily than the first metal oxide.

According to the second aspect of the methanol reforming catalyst of the present invention, since the catalytic component IIA that mainly accelerates the combustion reaction and the catalytic component IIB that mainly accelerates the steam reaction and the partial oxidation reaction by the alloying are provided, the overall catalyst can be heated in a shorter time and thus activated, in addition to the first aspect of the present invention. Therefore, the reduction in the start time of the methanol reforming reaction can be achieved.

A feature of the methanol reforming method of the present invention is the methanol reforming method using the methanol reforming catalyst having the above feature, and comprises the steps of executing a methanol reforming reaction by bringing a mixed gas containing methanol, steam, and oxygen into contact with the catalytic component II, and executing the methanol reforming reaction by bringing a gas reformed in above step and the mixed gas into contact with the catalytic component I.

According to the above methanol reforming method, since the partial oxidation reaction with the heat generation can be performed prior to the steam reaction, the methanol reforming reaction can be proceeded more smoothly.

A methanol reformer of the present invention comprises an inlet port of a gas, a reactor vessel having the methanol reforming catalyst of the above present invention and for causing a reforming reaction of a gas supplied from the inlet port of the gas, and an outlet port of a gas reformed by the reactor vessel A methanol reforming apparatus of the present invention comprises a methanol supply source, an oxygen supply source, a steam supply source, the methanol reformer of the above present invention, and pipes for supplying methanol, oxygen, and steam supplied from respective supply sources to the methanol reformer.

Since the methanol reformer and the methanol reforming apparatus of the present invention can omit the external heater such as the burner, etc. and the catalyst reducing apparatus, the size of the reformer and the reforming apparatus can be made smaller.

Also, a fuel cell system of the present invention comprises the methanol reforming apparatus of the present invention, a fuel cell, a pipe for supplying a gas reformed by the methanol reforming apparatus to the fuel cell, and a pipe for supplying a gas containing oxygen to the fuel cell According to the fuel cell system of the above present invention, since the reforming apparatus having the methanol reforming catalyst of the above present invention is employed, it is possible to reduce the size of the overall system. Therefore, the fuel cell system of the above present invention is suitable for the fuel cell system that has a size limitation of the apparatus and thus is equipped into the mobile body such as a car, a ship, etc.

BRIEF DESCRIPTION OF THE DRAWINGS

FIG. 7 and FIG. 8 are Table 1 and Table 2 showing manufacturing conditions and catalytic characteristics of the methanol reforming catalyst in Examples and Comparative examples.

Figure 1A:
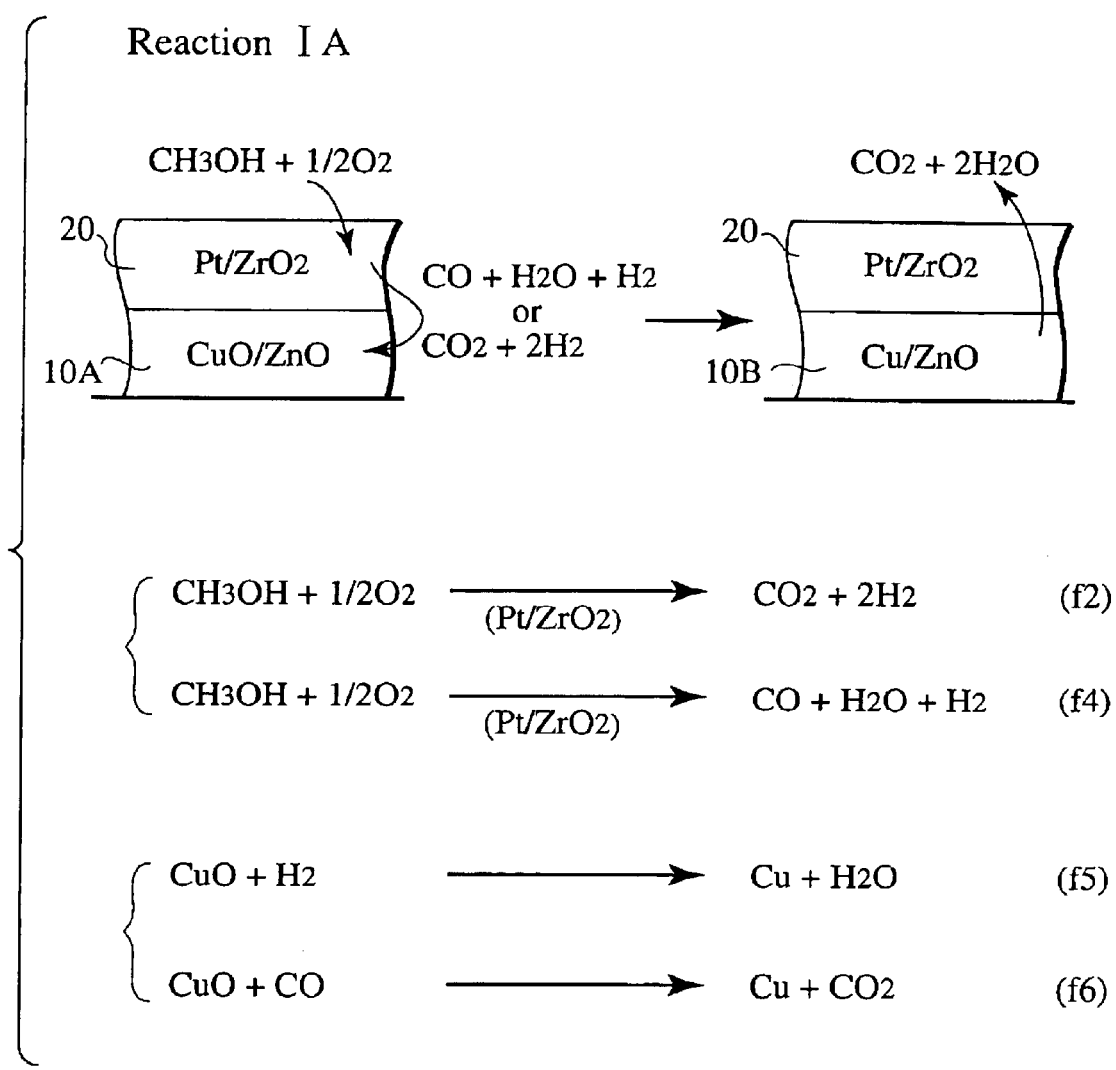
FIGS. 1A to 1C are views showing a reaction mechanism of a methanol reforming catalyst according to a first embodiment of the present invention.

DESCRIPTION OF THE PREFERRED EMBODIMENTS (First Embodiment)

A methanol reforming catalyst according to a first embodiment promotes the reaction that reforms a fuel gas containing methanol by using a steam and oxygen to generate a reformed gas containing hydrogen, i.e., the so-called auto-thermal reforming process Any gas may be employed as the fuel gas if it contains the methanol. But the fuel gas may contain other components except the methanol, particularly hydrocarbon such as methane, propane, etc. and other hydrogen-containing fuels. An oxygen-containing gas such as an air, for example, may be employed as the oxygen.

The methanol reforming catalyst according to the first embodiment includes a catalytic component I containing Cu oxide and Zn oxide and a catalytic component II containing the metal oxide and any one of Pt and Pd. As the metal oxide on the catalytic component II, alumina ($Al_2O_3$), cerium oxide ($CeO_2$), zirconia ($ZrO_2$), silica ($SiO_2$), titania ($TiO_2$), magnesia (MgO), zinc oxide (ZnO), gallium oxide ($Ga_2O_3$), and indium oxide ($In_2O_3$), or their any mixtures may be listed.

Although not a limitative meaning, a combination of the noble metal and the metal oxide that can make its alloy is preferable as the catalytic component II, for example, a combination of Pd and ZnO is preferable.

The catalytic component II contacts a mixed gas containing the methanol and the oxygen at the time of starting the auto-thermal reforming process, and promotes the partial oxidation reaction expressed by following Eq. (f2) or Eq. (f4).

$$CH_3OH + \tfrac{1}{2}O_2 \rightarrow CO_2 + 2H_2 \qquad (f2)$$

$$CH_3OH + \tfrac{1}{2}O_2 \rightarrow CO + H_2O + H_2 \qquad (f4)$$

This partial oxidation reaction generates a heat for the steam reforming reaction and also supplies hydrogen ($H_2$) and carbon monoxide (CO) to the catalytic component I to accelerate the reduction and the alloying of the catalytic component I and thus induce the steam reforming reaction At the same time, the reduced catalytic component I induces the elementary process of the steam decomposition reaction and the water-gas-shift reaction.

It is desirable that, in view of the above function of the catalytic component I, the catalytic component II should be brought into contact with the above mixed gas prior to the catalytic component I or should be activated earlier than the catalytic component I even when the catalytic component II is brought into contact with the above mixed gas almost simultaneously with or later than the catalytic component I.

Accordingly, it is preferable that a structure in which a first catalyst portion containing mainly the catalytic component I is covered with a second catalyst portion containing mainly the catalytic component II, for example, should be employed. And, a structure having a mixed catalyst portion in which the catalytic component I and the catalytic component II are dispersed and mixed may be employed. Otherwise, on a single catalyst, the first catalyst portion containing mainly the catalytic component I may be arranged in the downstream side of the mixed gas and the second catalyst portion containing mainly the catalytic component II may be arranged in the upstream side of the mixed gas. In this care, it is preferable that both catalyst portions should be adjacently arranged.

A grain-like or pellet-like catalyst may be employed as the methanol reforming catalyst of the present embodiment. It is preferable that these catalyst components art coated on a ceramic or metallic monolithic substrate to improve the reaction efficiency. In this case, it is preferable that these catalytic components-impregnated supports that have a high specific surface area base material such as alumina, silica, or the like to extend a reaction surface area, are coated on the monolithic substrate. A honeycomb-like monolithic substrate can be used preferably as the monolithic substrate.

The methanol reforming catalyst of the first embodiment contains the catalytic component I and the catalytic component II as essential components. But a mixed ratio of them is not particularly limited and may be changed appropriately based on the reaction conditions, a hydrogen-containing rate of the resultant reformed gas, etc. As the representative mixing weight ratio, a weight ratio of the catalytic component I to the catalytic component II is 100:20 to 200.

It is preferable that, if the monolithic substrate is employed, all catalytic components of the catalytic component I and the catalytic component II should be set to almost 100 to 400 g/L.

A methanol reforming method of the first embodiment is a method to employ the above methanol reforming catalyst of the present invention. In order to improve the effective use of the heat quantity and the durability of the catalyst, the catalytic component II is brought into contact with the above mixed gas prior to the catalytic component I, which can be implemented by employing the structure in which the first catalyst portion containing mainly the catalytic component I is covered with the second catalyst portion containing mainly the catalytic component II.

A reaction mechanism of the methanol reforming catalyst of the first embodiment will be explained in detail with reference to the accompanying drawings hereinafter.

Figure 1B:
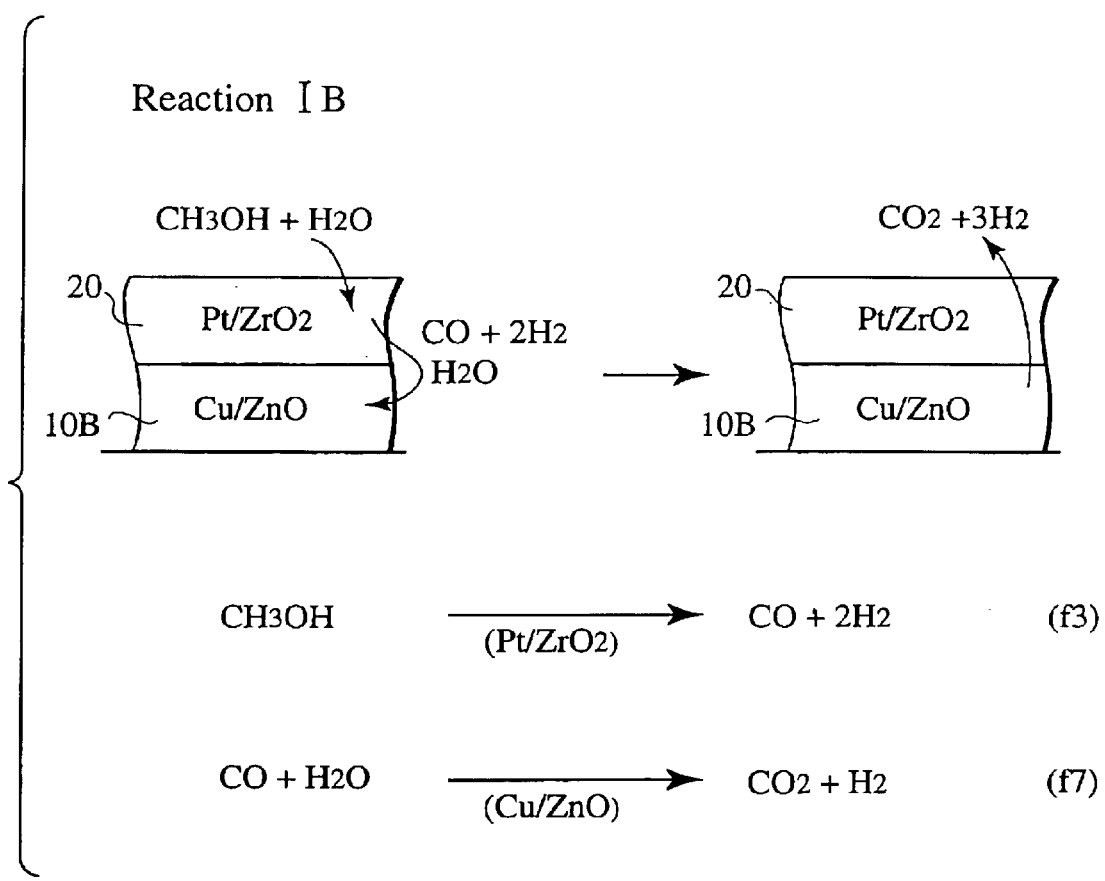
Figure 1C:
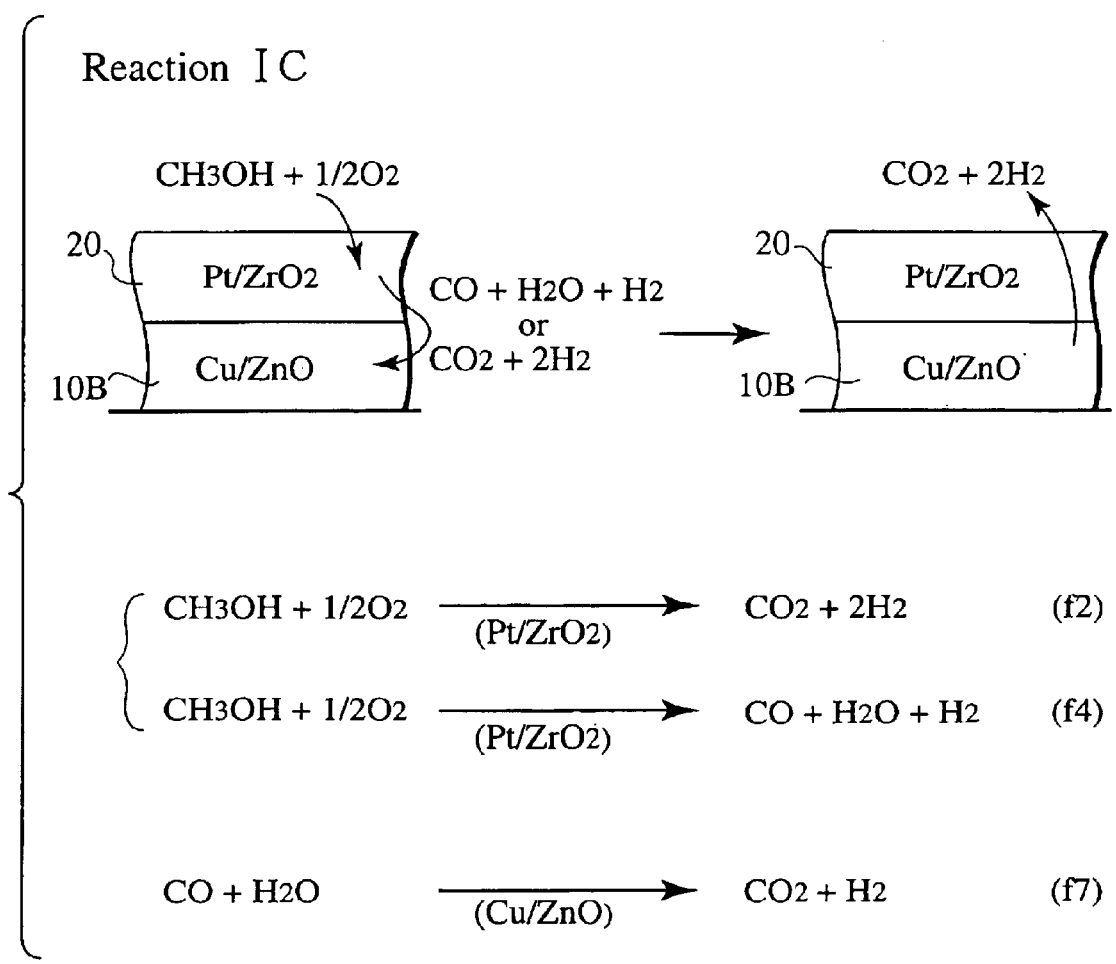

FIGS. 1A to 1C show an example of a reforming mechanism of the methanol catalyst according to the first embodiment. The methanol reforming catalyst Contains a mixture (CuO/ZnO) of copper oxide and zinc oxide as the catalytic component I and a mixture (Pt/$ZrO_2$) of platinum and zirconia as the catalytic component II. The catalytic component I is contained mainly in an underlying first catalyst layer 10A, and the catalytic component II is contained in a second catalyst layer 20 that is coated on the first catalyst layer 10A.

First, as shown in FIG. 1A, in starting the reforming reaction, i.e., at the time of Starting the reforming apparatus, the partial oxidation reactions expressed by Eq. (f2) and Eq. (f4) as the exothermic reaction are mainly executed on Pt/$ZrO_2$ of the second catalyst layer 20 and accordingly the temperature of the overall catalyst layers is increased.

Then, CuO as the oxide in the first catalyst layer 10A is reduced into Cu by the generated heat and generated $H_2O$ and CO based on following Eq. (f5) or Eq. (f6). Then, the first catalyst layer 10A is formed as a first catalyst layer 10B containing Cu/ZnO.

$$CuO + H_2 \rightarrow Cu + H_2O \qquad (f5)$$

$$CuO + CO \rightarrow Cu + CO_2 \qquad (f6)$$

Then, as shown in FIG. 1B, after respective catalyst layers are activated by the temperature increase of the catalyst layers, the methanol reforming reaction is accelerated by the first catalyst layer 10B and the second catalyst layer 20 during the reaction between the methanol and the steam in the auto-thermal reforming process. More particularly, a methanol decomposition reaction expressed by following Eq. (f3) occurs on the Pt/ZrO2 of the second catalyst layer 20, and thus $H_2$ and CO are generated. This CO reacts with the steam on Cu/ZnO of the reduced first catalyst layer 10B, and then $H_2$ and $CO_2$ are generated. This reaction is called water-shift reaction and expressed by following Eq. (f7). As a result, a CO concentration in the resultant reformed gas is decreased.

$$CH_3OH \rightarrow CO + 2H_2 \qquad (f3)$$

$$CO + H_2O \rightarrow CO_2 + H_2 \qquad (f7)$$

While, as shown in FIG. 1C, in the reaction between the methanol and the oxygen in the auto-thermal reforming process, the partial oxidation reaction caused by the methanol and the oxygen and expressed by (f2) or (f4) occurs on Pt/$ZrO_2$ of the second catalyst layer 20. The CO by-producted by the reaction expressed by (f4) causes the water-gas-shift reaction expressed by the above Eq. (f7) with the steam on Cu/ZnO of the first catalyst layer 10B, and then $CO_2$ and $H_2$ are generated. As a result, an amount of CO in the resultant reformed gas can be reduced.

Next, a reforming mechanism of another methanol reforming catalyst according to the first embodiment will be explained with reference to FIGS. 2A to 2C. The methanol reforming catalyst contains a mixture (CuO/ZnO) of copper oxide and zinc oxide as the catalytic component I and a mixture (Pt/ZrO$_2$) of platinum and zirconia as the catalytic component II The catalytic component I is contained mainly in an underlying first catalyst layer 15A, and the catalytic component II is contained in a second catalyst layer 25A that is coated on the first catalyst layer 15A.

Figure 2A:
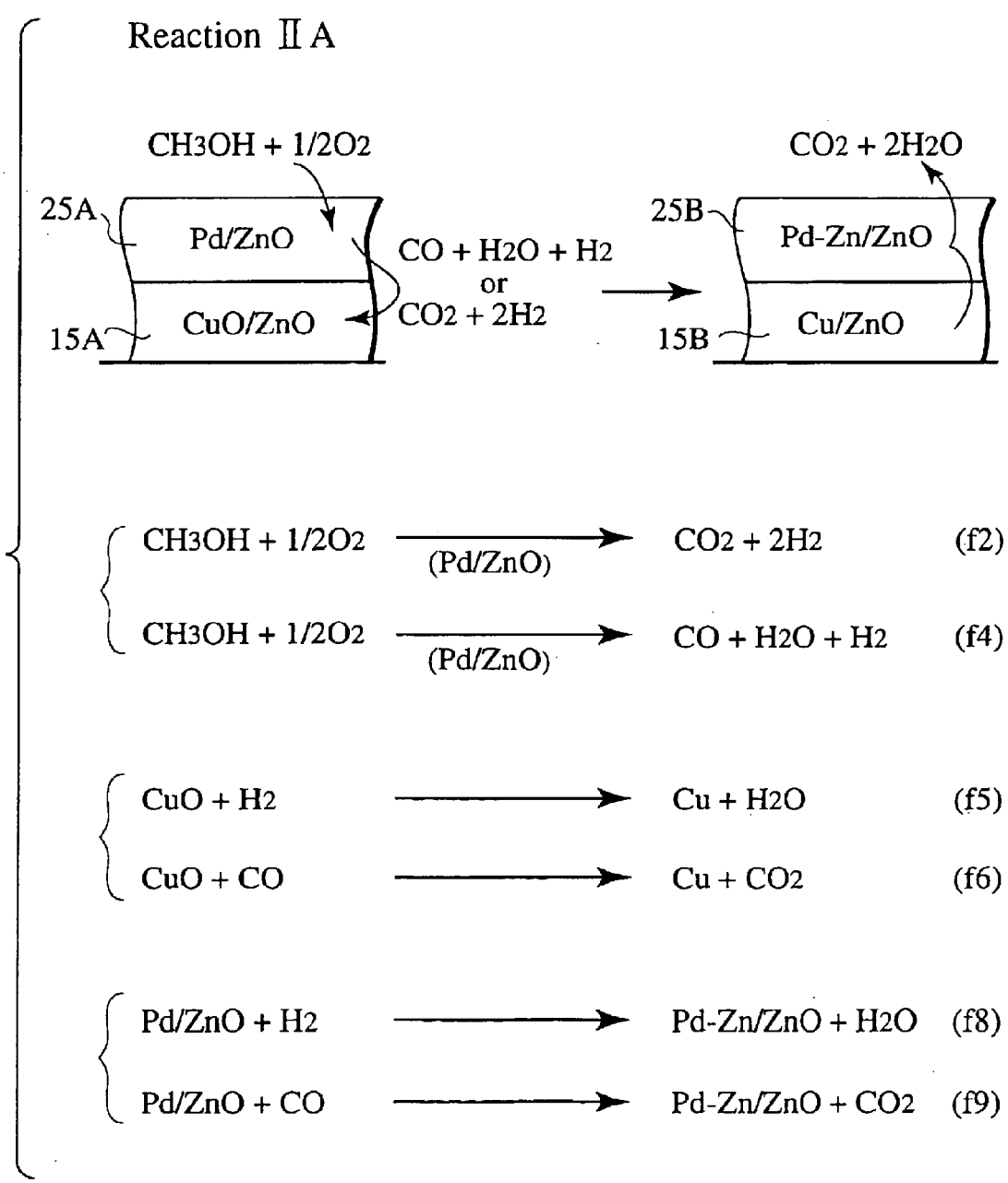
FIGS. 2A to 2C are views showing a reaction mechanism of another methanol reforming catalyst according to the first embodiment of the present invention.

First, as shown in FIG. 2A, in starting the reforming reaction, i.e., at the time of starting the reforming apparatus, the partial oxidation reaction of the methanol expressed by Eq. (f2) and Eq. (f4) as the exothermic reaction is mainly executed on Pd/ZnO of the second catalyst layer 25A. Accordingly, CuO in the first catalyst layer 15A is reduced into Cu by the heat generated by this reaction and generated H$_2$O and CO based on the reducing reaction expressed by Eq. (f5) or Eq. (f6).

Then, Pd/ZnO in the second catalyst layer 25A is also reduced by the following reaction expressed by Eq. (f8) or Eq. (f9), and then Pd and Zn are alloyed to produce the second catalyst layer 25B (Pd—Zn/ZnO).

$$Pd/ZnO+H_2 \rightarrow Pd\text{—}Zn/ZnO+H_2O \qquad (f8)$$

$$Pd/ZnO+CO \rightarrow Pd\text{—}Zn/ZnO+CO_2 \qquad (f9)$$

Figure 2B:
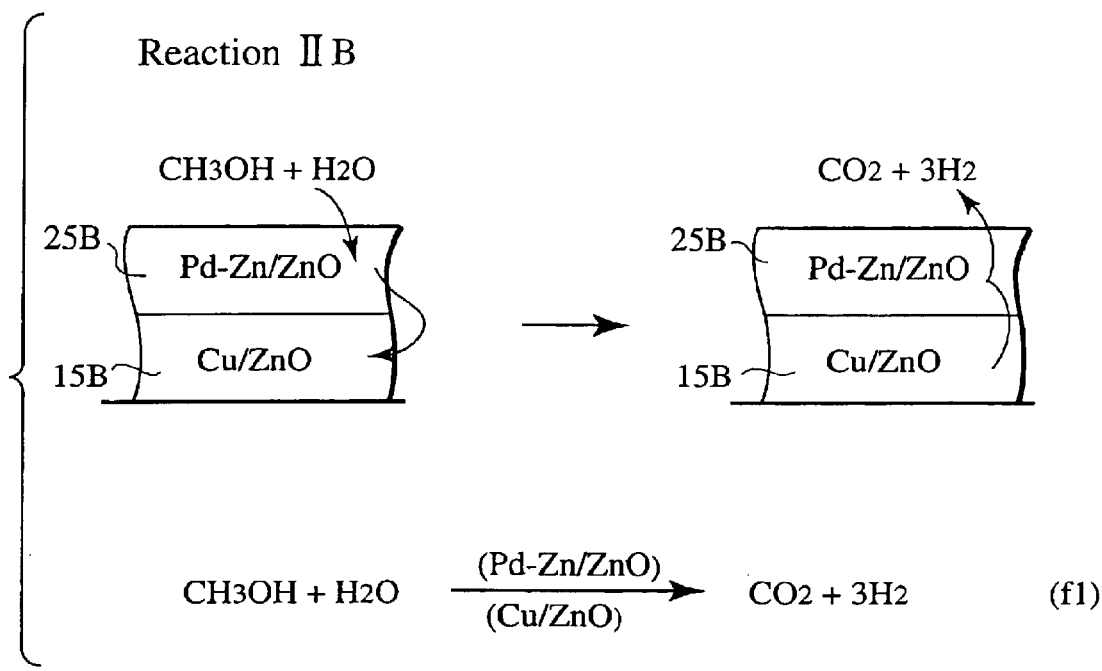

Then, as shown in FIG. 2B, when respective catalyst layers are activated, mainly the steam reforming reaction of the methanol expressed by (f1) is caused on Pd—Zn/ZnO of the second catalyst layer 25B and Cu/ZnO of the first catalyst layer 15B during the reaction between the methanol and the steam in the auto-thermal reforming process.

Figure 2C:
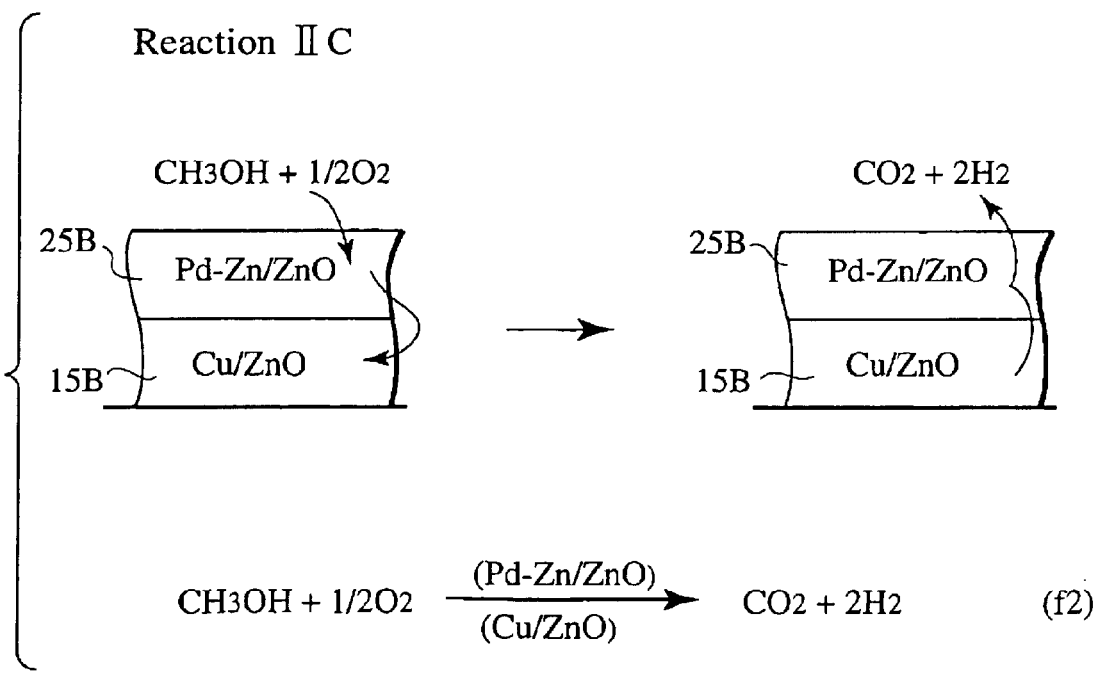

While, as shown in FIG. 2C, in the reaction between the methanol and the oxygen in the auto-thermal reforming process, mainly the partial oxidation reaction of the methanol expressed by (f2) and (f4) is caused on Pd—Zn/ZnO of the second catalyst layer 25B and Cu/ZnO of the first catalyst layer 15B.

The CO by-producted by the methanol decomposition reaction (f3) and the partial oxidation reaction (f4) is changed to CO$_2$ by the water-gas-shift reaction (f7) on Cu/ZnO of the first catalyst layer 15B. As a result, an amount of CO in the reformed gas is decreased.

It is not limited that the catalytic component I and the catalytic component II further contain the metal oxide except the above respectively. In the above example, Pd and Zn are alloyed in the catalytic component II contained in the second catalyst layer during the methanol reforming reaction. However, a Pd—Zn alloy may be contained in the catalytic component II previously. In this case, generation of CO can be reduced much more. Also, it is preferable that the metal oxide should be impregnated with this Pd—Zn alloy For example, it is preferable that this metal oxide substrate should be formed of CeO$_2$ or ZrO$_2$.

(Second Embodiment)

A methanol reforming catalyst according to a second embodiment includes a catalytic component I containing Cu oxide and Zn oxide, a catalytic component IIA containing a first metal oxide and a noble metal, and a catalytic component IIB containing a second metal oxide and any one of Pt and Pd. Here it is preferable that the second metal oxide is ready to form a compound with Ft or Pd rather than the first metal oxide.

For example, as the first metal oxide in the catalytic component IIA, alumina (Al$_2$O$_3$), cerium (IV) oxide (CeO$_2$), zirconia (ZrO$_2$), Silica (SiO$_2$), or their any mixtures may be listed. While, as the second metal oxide in the catalytic component IIB, titania (TiO$_2$), magnesia (MgO), Zinc oxide (ZnO), gallium oxide (Ga$_2$O$_3$), and indium oxide (In$_2$O$_3$), or their any mixtures may be listed.

It is not limited that the catalytic component IIA and the catalytic component IIB may further contain other metal oxide except the above respectively. Platinum, palladium, rhodium, etc. may be employed as the noble metal in the catalytic component IIA.

The catalytic component IIA containing the first metal oxide and the noble metal comes into contact with the mixed gas containing the methanol and the oxygen in starting the reforming reaction, and then accelerates not only the partial oxidation reaction expressed by following Eq. (f2) or (f4) but also the methanol decomposition reaction expressed by Eq. (f3) according to the proceed of the catalyst activation.

$$CH_3OH+\tfrac{1}{2}O_2 \rightarrow CO_2+2H_2 \qquad (f2)$$

$$CH_3OH+\tfrac{1}{2}O_2 \rightarrow CO+H_2O+H_2 \qquad (f4)$$

$$CH_3OH \rightarrow CO+2H_2 \qquad (f3)$$

These reactions are all the exothermic reaction. That is, these reactions have such an advantage that promotes the combustion reaction and also heats/activates the overall catalyst layers in a short time.

Meanwhile, the catalytic component IIB containing the second metal oxide and; Pt or Pd, promotes the exothermic reaction as mentioned above. However, since the second metal oxide is alloyed more easily than the first metal oxide, the alloy of the second metal oxide and; Pt or Pd can be formed. For example, if Pd and ZnO are used as the catalytic component IIB, an alloy Pd—Zn can be formed by the reducing reaction given by following Eqs. (f8), (f9).

$$Pd/ZnO+H_2 \rightarrow Pd\text{—}Zn/ZnO+H_2O \qquad (f8)$$

$$Pd/ZnO+CO \rightarrow Cu+PD\text{—}Zn/ZnO+CO_2 \qquad (f6)$$

Under the catalyst containing the alloyed noble metal component, the above methanol decomposition reaction accelerating effect can be, reduced and alternatively the steam reaction (f1) as the endothermic reaction and the partial oxidation reaction (f2) as the exothermic reaction can be accelerated.

CuO in the catalytic component I is reduced into Cu by the heat generated by the partial oxidation reaction being accelerated by the catalytic component IIA and the catalytic component IIB and the generated reducing gas in accordance with the reducing reaction expressed by (f5), (f6), and then the catalytic component I promotes the steam reaction (f1) and the partial oxidation reaction (f2) after the catalyst is activated.

$$CuO+H_2 \rightarrow Cu+H_2O \qquad (f5)$$

$$CuO+CO \rightarrow Cu+CO_2 \qquad (f6)$$

The CO generated once under the catalytic component IIA and the catalytic component IIB can be changed into the CO$_2$ by the above reducing reaction and the water-shift reaction (f7) caused on the reduced catalytic component I.

The catalyst of the second embodiment reaches the activation temperature in a short time because of the catalytic component IIA that promotes the combustion reaction. Accordingly the starting characteristic of the methanol reforming reaction can be improved.

The catalytic component I, the catalytic component IIA and the catalytic component IIB may be dispersed and mixed in a single catalyst layer or a single catalyst part. However, in light of the functions of respective catalytic components, a structure in which the catalytic component I having weak oxidation resistance is not exposed to a surface of the catalyst is preferable. Also, a structure in which the catalytic component IIA, that generates a large amount of carbon monoxide (CO), and the catalytic component I, that should be placed in the reducing atmosphere, are adjacently arranged is preferable.

Figure 3A:
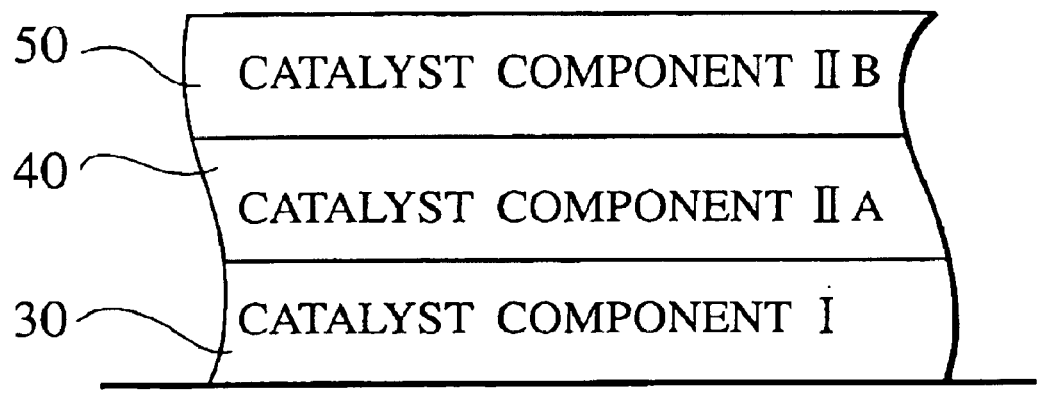
FIGS. 3A and 3B are schematic sectional views showing an example of a configuration of a methanol reforming catalyst according to a second embodiment of the present invention respectively.
Figure 3B:
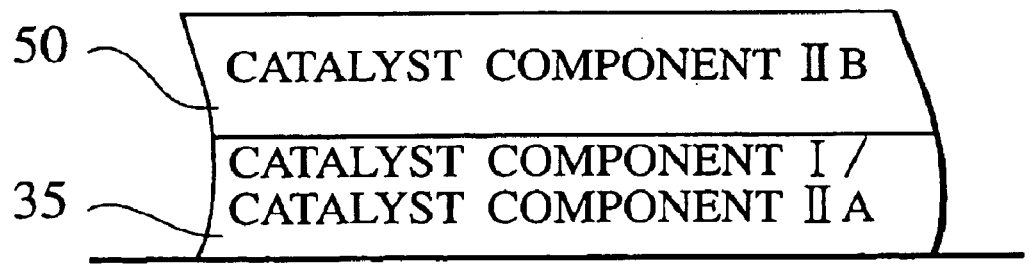

FIGS. 3A and 3B are views showing an example of a configuration of the catalyst in view of the above functions of respective catalytic components.

As shown in FIG. 3A, the catalyst according to the second embodiment has a triple-layered structure in which a first catalyst layer 30, a second catalyst layer 40 and a third catalyst layer 50 are laminated from the bottom. The first catalyst layer 30 may mainly contain the catalytic component IIA having a high flammability, the second catalyst layer 40 may mainly contain the catalytic component I, and the third catalyst layer 50 may mainly contain the catalytic component IIB.

Also, as shown in FIG. 3B, the catalyst according to the second embodiment may have a double-layered structure in which a first catalyst layer 35, and a second catalyst layer 45 are laminated from the bottom. The catalytic component IIA having the high flammability and the catalytic component I may be dispersed/mixed in the first catalyst layer 35, and mainly the catalytic component IIB may be contained in the second catalyst layer 45.

In the above example, if the previously alloyed Pd—Zn is contained in the catalytic component IIB contained in the third catalyst layer 50 or the second catalyst layer 45, generation of CO can be reduced much more. It is preferable that the metal oxide is impregnated with the Pd—Zn alloy. For example, CeO or $ZrO_2$ is preferable as the metal oxide substrate.

Like the methanol reforming catalyst according to the first embodiment, the methanol reforming catalyst according to the second embodiment may be coated on the monolithic substrate or the grain-like or pellet-like catalyst may be employed.

Figure 4A:
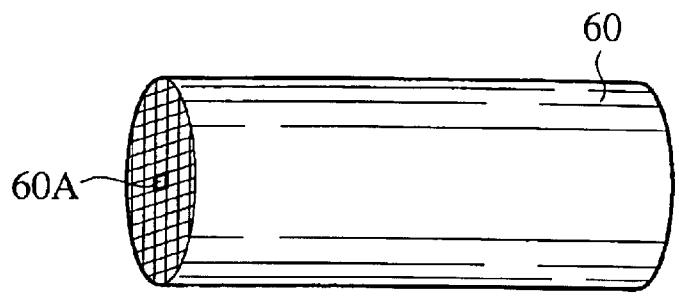
FIG. 4A is a perspective view showing the methanol reforming catalyst according to the first or second embodiment, in which a catalyst layer is coated on respective inner walls of a monolithic substrate.

FIG. 4A is a perspective view showing the methanol reforming catalyst according to the first Or second embodiment. The methanol reforming catalyst is coated on a ceramic or metal honeycomb-like monolithic substrate 60. The monolithic substrate has a plurality of hollow cells 60A and, as shown in FIG. 4A, a catalyst material 70 according to the first or second embodiment is coated on inner surfaces of respective hollow cells 60A.

Figure 5:
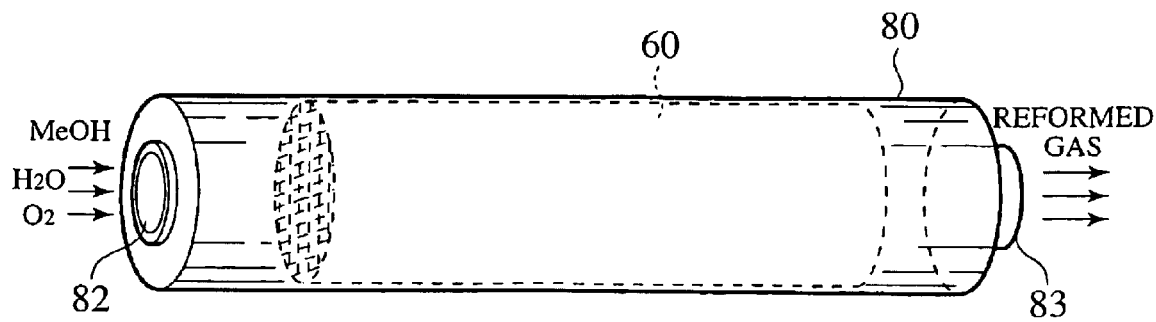
FIG. 5 is a perspective view showing a reformer having the methanol reforming catalyst according to the first or second embodiment.

FIG. 5 shows a methanol reformer according to the first or second embodiment. As shown in FIG. 5, the reformer has a reactor vessel 80 in which the reforming reaction is executed and the methanol reforming catalyst 60 is provided in the reactor vessel 80. A gas inlet port 82 for introducing a methanol gas, a steam gas, and an oxygen gas is provided to one end portion of the reactor vessel 80 and a gas outlet port 83 for outputting the reformed gas is provided to the other end portion.

Figure 4B:
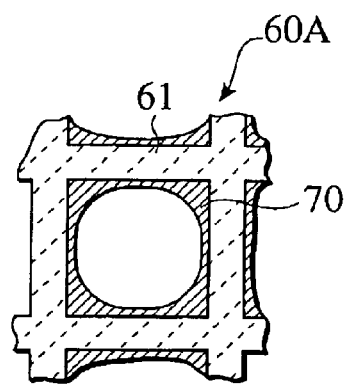
FIG. 4B is an enlarged sectional view showing a cell of the monolithic substrate shown in FIG. 4A.

The reactor vessel 80 is not particularly limited if mainly the partial oxidation reaction and the steam reforming reaction of the methanol, The oxygen and the steam can be carried out therein. Thus, any vessel may be employed if it can withstand the high temperature and the pressure to some extent. Also, this vessel is not limited to the pipe shape shown in FIG. 4. Any shape or structure may be employed if the methanol reforming catalyst can be filled into the vessel. In addition, the gas inlet port 82 is not limited to a single port and a plurality of gas inlet ports may be employed.

Figure 6:
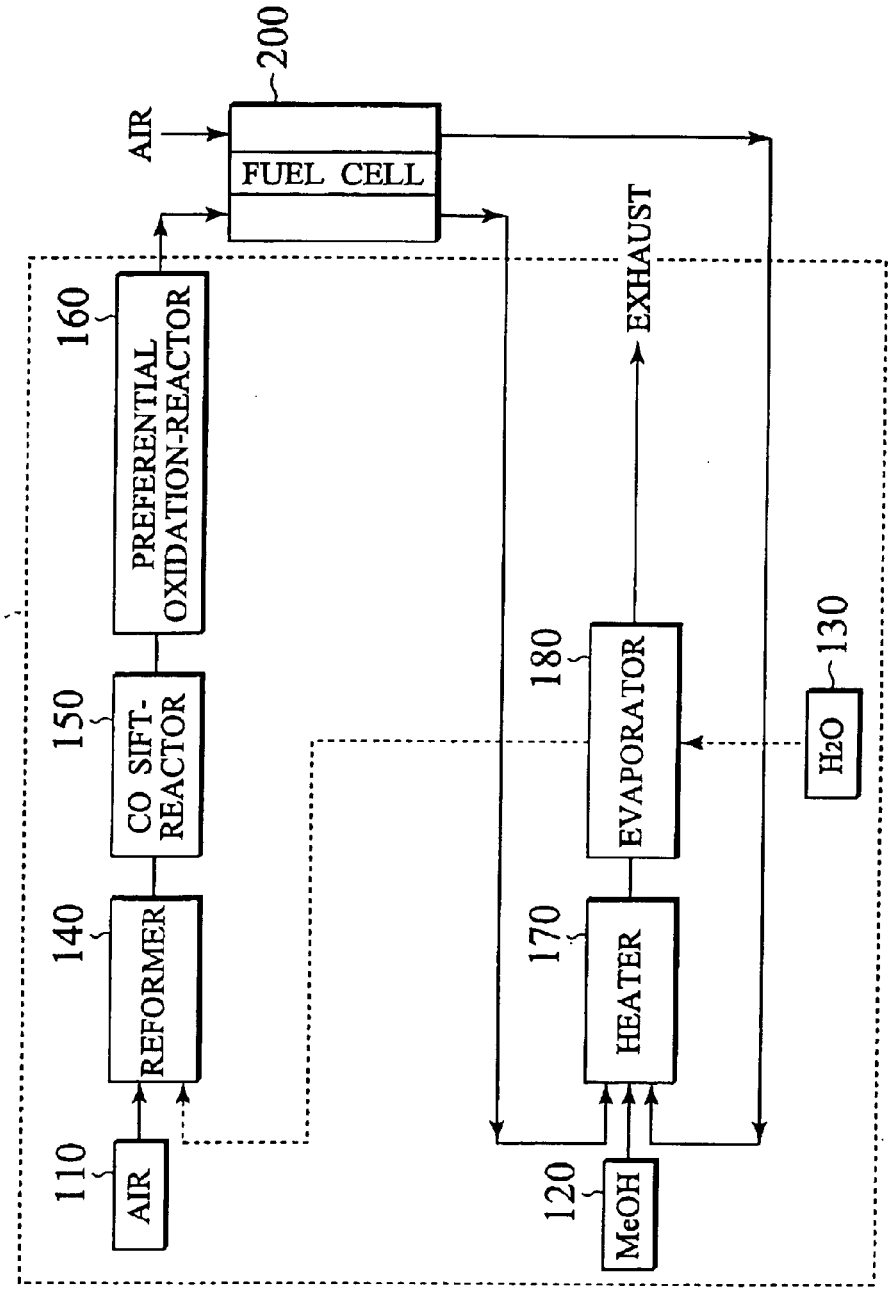
FIG. 6 is view showing an example of a configuration of a fuel cell system employing the reformer shown in FIG. 5.

FIG. 6 is view showing an example of a configuration of a fuel cell system employing the methanol reforming apparatus according to the first or second embodiment. As shown in FIG. 6, respective gases are introduced into a reformer 140 from a methanol supply source 120, an oxygen supply source 110 and a steam supply source 130. The methanol is gasified by a heater 170, then mixed with the steam by an evaporator 180, and then introduced into the reformer 140. The air is introduced as the oxygen. These gases are reformed into the hydrogen-containing gas with the intervention of the methanol reforming catalyst according to the first or second embodiment in the reformer 140.

In the methanol reforming catalyst according to the first or second embodiment, a CO gas in the reformed gas has originally a low concentration. But it is preferable that a CO concentration in the reformed gas should be reduced further more by a CO shift-reactor 150 and a preferential oxidation-reactor 160 It is also preferable that the CO concentration in the reformed gas introduced finally into a fuel cell 200 should be reduced into less than 40 ppm to 50 ppm.

The fuel cell 200 has a cell unit having a structure in which a fuel electrode (anode) and an air electrode (cathode) are opposed to each other via electrolyte. A type of the fuel cell 200 is not particularly limited. For example, the solid-state polymer electrode fuel cell may be employed preferably.

The reformed gas in which CO concentration is very low is supplied to the fuel electrode, and the air containing the oxygen, for example, is supplied to the air electrode. These gases can generate an electromotive force based on the electrochemical reaction and also generate the steam An exhaust gas containing the hydrogen and an air are returned to the heater 170 and the evaporator 180 and then reused as a fuel gas.

The methanol supply source 120, the oxygen supply source 110 and the steam supply source 130 are enough to use if they can supply the methanol, the oxygen and the steam to the reformer 140 respectively. Various vessels Or bombs may be exemplified.

Connections between respective gas supply sources and the reformer 140 and connection between the reformer 140 and the fuel cell 200 may be implemented by appropriate pipes. Various sensors such as a flow-meter, a pressure gauge, a thermometer, etc. and compression-supplying means such as a pump, etc. may be provided in the middle of such pipes, and thus supply of respective materials such as the methanol can be controlled.

In this case, since the partial oxidation reaction occurs prior to or almost simultaneously with the steam reforming reaction, the methanol supplying path and the oxygen supplying path may be jointed at the upstream side rather than the reforming portion.

Examples of the methanol reforming catalyst according to the embodiments will be explained hereinafter.

EXAMPLE #1

A slurry was prepared by mixing the commercially available Cu/ZnO based methanol reforming catalyst power 100 g and an 8 weight % nitric acid alumina sol 100 g. Then, the first catalyst layer was formed by coating this slurry on the ceramic monolithic substrate to get 100 g/L as the catalyst powder weight, then drying it at 150° C. for 10 minutes, and then burning it in the air at 400° C.

The catalyst powders were prepared by spraying a palladium nitride aqueous solution onto zinc oxide until an amount of impregnated metal becomes 5 weight %, then drying it, and then burning it. Then, a slurry was prepared by mixing these catalyst powders 100 g and the 8 weight % nitric acid alumina sol 100 g. Then, the second catalyst layer was formed by coating this slurry on the first catalyst layer to get 100 g/L as the catalyst powder weight, then drying it at 150° C. for 10 minutes, and then burning it in the air at 400° C.

As a result, the catalyst that contained CuO and ZnO as the catalytic component I in the first catalyst layer and contained Pd and ZnO as the catalytic component II in second catalyst layer was obtained

EXAMPLE #2

First, the first catalyst layer was formed by using the same conditions as the Example 1.

Then, the catalyst powders were prepared by spraying the palladium nitride and zinc nitrate aqueous solution onto zirconia-ceria powders until an amount of impregnated metal becomes 5 weight %, drying and burning it. Then, a slurry was prepared by mixing these catalyst powders 100 g and the 8 weight % nitric acid alumina sol 100 g. Then, the second catalyst layer was formed by coating this slurry on the first catalyst layer to get 100 g/L as the catalyst powder weight, then drying it at 150° C. for 10 minutes, and then burning it in the air at 400° C.

As a result, the catalyst that contained CuO and ZnO as the catalytic component I in the first catalyst layer and contained Pd—Zn alloy-impregnated compound oxide of $CeO_2$ and $ZrO_2$ as the catalytic component II in the second catalyst layer was obtained.

EXAMPLE #3

First, the first catalyst layer was formed by using the same conditions as the Examples 1, 2.

Then, the catalyst powders were obtained by spraying a dinitrodiamine platinum aqueous solution onto γ alumina until an amount of impregnated metal becomes 5 weight %, drying and burning it. A slurry was prepared by mixing the catalyst powders 100 g and the 8 weight % nitric acid alumina sol 100 g. Then, the second catalyst layer was formed by coating this slurry on the first catalyst layer to get 30 g/L as the catalyst powder weight, then drying it at 150° C. for 10 minutes, and then burning it in the air at 400° C.

In addition, the catalyst powders were prepared by spraying the palladium nitride aqueous solution onto zinc oxide until an amount of impregnated metal becomes 5 weight %, drying and burning it. A slurry was prepared by mixing these catalyst powders 100 g and the 8 weight % nitric acid alumina sol 100 g. Then, the third catalyst layer was formed by coating this slurry on the second catalyst layer to get 100 g/L as the catalyst powder weight, then drying it at 150° C. for 10 minutes, and then burning it in the air at 400° C.

As a result, the catalyst that contained CuO and ZnO as the catalytic component I in the first catalyst layer, contained Pt and $Al_2O_3$ as the catalytic component IIA in the second catalyst layer, and contained Pd and ZnO as the catalytic component IIB in the third catalyst layer was obtained.

EXAMPLE #4

First, the first catalyst layer and the second catalyst layer were formed by using the same conditions as the Example 3.

Then, the catalyst powders were prepared by spraying the palladium nitride and zinc nitrate aqueous solution onto zirconia-ceria powders until an amount of impregnated metal becomes 5 weight %, drying and burning it. Then, a slurry was prepared by mixing these catalyst powders 100 g and the 8 weight % nitric acid alumina sol 100 g. Then, the third catalyst layer was formed by coating this slurry on the second catalyst layer to get 100 g/L as the catalyst powder weight, then drying it at 150° C. for 10 minutes, and then burning it in the air at 400° C.

As a result, the catalyst that contained CuO and ZnO as the catalytic component I in the first catalyst layer, contained Pt and $Al_2O_3$ as the catalytic component IIA in the second catalyst layer, and contained Pd—Zn alloy-impregnated compound oxide of $CeO_2$ and $ZrO_2$ as the catalytic component IIB in the third catalyst layer was obtained.

EXAMPLE #5

First, a slurry was prepared by mixing the catalyst powders 100 g, that were obtained by spraying a dinitrodiamine platinum aqueous solution onto alumina until an amount of impregnated metal becomes 5 weight %, drying and burning it, and the 8 weight % nitric acid alumina sol 100 g. Then, the first catalyst layer was formed by coating this slurry on the ceramic monolithic substrate to get 30 g/L as the catalyst powder weight, then drying it at 150° C. for 10 minutes, and then burning it in the air at 400° C.

Then, a slurry was prepared by mixing the commercially available Cu/ZnO based methanol reforming catalyst power 100 g and the 8 weight % nitric acid alumina sol 100 g. Then, the second catalyst layer was formed by coating this slurry on the first catalyst layer to get 100 g/L as the catalyst powder weight, then drying it at 150° C. for 10 minutes, and then burning it in the air at 400° C.

In addition, the catalyst powders were prepared by spraying the palladium nitride aqueous solution onto zinc oxide until an amount of impregnated metal becomes 5 weight %, drying and burning it. A slurry was prepared by mixing these catalyst powders 100 g and the 8 weight % nitric acid alumina sol 100 g. Then, the third catalyst layer was formed by coating this slurry on the second catalyst layer to get 100 g/L as the catalyst powder weight, then drying it at 150° C. for 10 minutes, and then burning it in the air at 400° C.

As a result, the catalyst that contained Pt and $Al_2O_3$ as the catalytic component IIA in the first catalyst layer, contained CuO and ZnO as the catalytic component I in the second catalyst layer, and contained Pd and ZnO as the catalytic component IIB in the third catalyst layer was obtained.

EXAMPLE #6

First, the first catalyst layer and the second catalyst layer were formed by using the same conditions as the Example 5.

Then, the catalyst powders were prepared by spraying the palladium nitride and zinc nitrate aqueous solution onto zirconia-ceria powders until an amount of impregnated metal becomes 5 weight %, drying and burning it. Then, a slurry was prepared by mixing these catalyst powders 100 g and the 8 weight % nitric acid alumina sol 100 g. Then, the third catalyst layer was formed by coating this slurry on the surface of the second catalyst layer to get 100 g/L as the catalyst powder weight, then drying it at 150° C. for 10 minutes, and then burning it in the air at 400° C.

As a result, the catalyst that contained Pt and $Al_2O_3$ as the catalytic component IIA in the first catalyst layer, contained CuO and ZnO as the catalytic component I in the second catalyst layer, and contained Pd—Zn alloy-impregnated compound oxide of $CeO_2$ and $ZrO_2$ as the catalytic component IIB in the third catalyst layer was obtained.

EXAMPLE #7

The catalyst powders were obtained by spraying the dinitrodiamine platinum aqueous solution onto the γ alumina until an amount of impregnated metal becomes 5 weight %, drying and burning it. Then, a slurry was prepared by mixing the catalyst powders 100 g, the commercially available Cu/ZnO based methanol reforming catalyst power 100 g, and the 8 weight % nitric acid alumina sol 200 g. Then, a single catalyst layer was formed by coating this slurry on the ceramic monolithic substrate to get 200 g/L as the catalyst powder weight, then drying it at 150° C. for 10 minutes, and then burning it in the air at 400° C.

As a result, the catalyst in which CuO and ZnO as the catalytic component I and Pt and $Al_2O_3$ as the catalytic component II were mixed was obtained.

COMPARATIVE EXAMPLE #1

A slurry was prepared by mixing the catalyst powders 100 g, that were obtained by spraying a dinitrodiamine platinum aqueous solution onto γ alumina until an amount of impregnated metal becomes 5 weight %, drying and burning it, and the 8 weight % nitric acid alumina sol 100 g. Then, a first catalyst was formed by coating this slurry on the ceramic monolithic substrate to get 200 g/L as the catalyst powder weight, then drying it at 150° C. for 10 minutes, and then burning it in the air at 400° C.

Then, a slurry was prepared by mixing the commercially available Cu/ZnO based methanol reforming catalyst powers 100 g and the 8 weight % nitric acid alumina sol 100 g. Then, a second catalyst was formed by coating this slurry on the ceramic monolithic substrate to get 200 g/L as the catalyst powder weight, then drying it at 150° C. for 10 minutes, and then burning it in the air at 400° C.

The two catalysts of the first catalyst and the second catalyst were arranged in series in the axial direction.

COMPARATIVE EXAMPLE #2

A slurry was prepared by mixing the commercially available Cu and ZnO based methanol reforming catalyst powers 100 g and the 8 weight % nitric acid alumina sol 100 g. Then, a single catalyst layer was formed by coating this slurry on the ceramic monolithic substrate to get 200 g/L as the catalyst powder weight, then drying it at 150° C. for 10 minutes, and then burning it in the air at 400° C.

The catalyst containing CuO and ZnO was formed
[Test Conditions]

The catalysts obtained in Examples 1 to 7 and Comparative examples 1 and 2 were reduced in the hydrogen stream at 400° C. for 1 hour, and then the auto-thermal reforming process of the methanol was performed by using an atmospheric-pressure-flowing-type reactor fixed on a floor. The reaction temperature was set to 400° C. and S/C (mole ratio of the steam and the methanol) was set to 1.5, and $O_2/C$ (mole ratio of the oxygen and the methanol) was set to 0.15 to 0.2.

The composition of the reformed gas was analyzed by the gas chromatograph, and the CO concentration and the reformation ratio were measured after 0.5 minute, 1 minute, and 5 minutes from the start of the reaction. Also, in the Examples 1, 2 and the Comparative Example 2, the reform ratio was measured after 50 hours-reaction.

The results are shown in Table 1 and Table 2 of FIG. 7. As apparent from these results, the methanol reforming catalysts in Examples 1 to 7 are the methanol reforming catalysts that have the low CO concentration in the reformed gas, and are excellent in the catalytic activity, and are excellent in the starting characteristic and the durability in comparison with the catalyst in Comparative Example 1, in which the Pd catalyst and the Cu catalyst are arranged in parallel, and the Cu—ZnO catalyst in Comparative Example 2 in the prior art.

In particular, it has been confirmed that the catalysts having the triple-layered structure in Example 3 to Example 6, which have Pt/Al2O3 component in the first catalyst layer or the second catalyst layer, accelerates starting time of reforming reaction.

Also, as shown in Table 2, it has been confirmed by the comparison between Example 1 and Example 2 that, the catalyst having Pd—Zn—$CeO_2$—$ZrO_2$ component as the catalytic component II in the second catalyst layer is excellent in the durability.

As described above, according to the present invention, the Cu—Zn based catalytic component and the catalytic component containing the specific metal oxide and the noble metal are employed in combination. Therefore, it is possible to provide the methanol reforming catalyst and the methanol reforming method that can implement the compact and high performance reforming apparatus which is excellent in the durability, generates a small amount of carbon monoxide.

The entire contents of Japanese Patent Applications P11-356674 (filed Dec. 15, 1999) and P2000-368625 (filed Dec. 4, 2000) are incorporated herein by reference.

Although the invention has been described above by reference to certain embodiments of the invention, the invention is not limited to the embodiments described above. Modifications and variations of the embodiments described above will occur to those skilled in the art in light of the above teachings, For example, the methanol reforming catalyst of the present invention can be applied to the hydrogen-containing fuel except the methanol, e.g., lower hydrocarbon such as dimethyl ether, etc. by interposing the preheating step.

In addition, the methanol reforming catalyst of the present invention is suitable for the methanol reforming apparatus for the fuel cell, especially the polymer electrolyte fuel cell. Accordingly, the small power generating system can be obtained with a simple configuration, and such power generating system is promising as a power source of the electric car.

What is claimed is:

1. A methanol reforming catalyst being used with methanol gas and oxide containing gas, comprising:
    a first catalyst portion; and
    a second catalyst portion covering the first catalyst portion and being configured to contact the methanol gas and oxide containing gas earlier than the first catalyst;
    wherein a catalytic component I containing copper oxide and zinc oxide is mainly contained in the first catalyst portion, and a catalytic component II containing a metal oxide and one of platinum and palladium is mainly contained in the second catalyst portion.

2. A methanol reforming catalyst being used with methanol gas and oxide containing gas comprising:
    a catalyst portion in which a catalytic component I and a catalytic component II are dispersed and mixed, wherein the catalyst component I contains copper oxide and zinc oxide and the catalytic component II contains a metal oxide and one of platinum and palladium and the catalyst portion being configured to contact the methanol gas and oxide containing gas.

3. The methanol reforming catalyst as in claim 1, wherein the metal oxide is at least one selected from the group consisting of alumina, cerium oxide, zirconia, silica, titania, magnesia, zinc oxide, gallium oxide, and indium oxide.

4. The methanol reforming catalyst as in claim 1, wherein the catalytic component II contains palladium, zinc oxide, cerium oxide, and zirconia.

5. A methanol reforming catalyst comprising:
- a catalyst substrate;
- a first layer being formed on the catalyst substrate and containing a catalytic component IIA having a first metal oxide and a noble metal;
- a second layer being formed on the first layer and containing a catalytic component having copper oxide; and
- a third layer being formed on the second layer and containing a catalytic component IIB having a second metal oxide and one of Pt and Pd;
- wherein the first, second and third layers are laminated in a vertical direction to a surface of the catalyst substrate, and the second metal oxide forms an alloy with noble metal more easily than the first metal oxide.

6. A methanol reforming catalyst comprising:
- a catalyst substrate;
- a first layer being formed on the catalyst substrate and containing a catalytic component I and having Cu oxide and Zn oxide and a catalytic component IIA having a first metal oxide and a noble metal; and
- a second layer being formed on the first layer and containing a catalytic component IIB having a second metal oxide and one of Pt and Pd
- wherein the first and second layers are laminated in a vertical direction to a surface of the catalyst substrate, and the second metal oxide forms an alloy with noble metal more easily than the first metal oxide.

7. The methanol reforming catalyst as in claim 5, wherein the first metal oxide is at least one selected from the group consisting of alumina, cerium oxide, zirconia, and silica, and
the second metal oxide is at least one selected from the group consisting of titania, magnesia, zinc oxide, gallium oxide, and indium oxide.

8. The methanol reforming catalyst as in claim 5, wherein the catalytic component IIB contains palladium, zinc oxide, cerium oxide, and zirconia.

9. A method of reforming methanol using the methanol reforming catalyst set forth in claim 5, comprising the steps of:
- promoting a methanol reforming reaction by bringing a mixed gas containing methanol, steam, and oxygen into contact with the catalytic component IIB; and
- promoting the methanol reforming reaction by bringing a gas reformed in above step and the mixed gas into contact with the catalytic component contained in the second layer.

10. A method of reforming methanol using the methanol reforming catalyst set forth in claim 5, comprising the steps of:
- promoting a methanol reforming reaction by bringing a mixed gas containing methanol, steam, and oxygen into contact with the catalytic component IIB; and
- promoting the methanol reforming reaction by bringing a gas reformed in above step and the mixed gas into contact with the catalytic component contained in the second layer and the catalytic component IIA simultaneously or successively.

* * * * *